No. 12,060. Reissued Nov. 25, 1902.

W. G. HAAS.

PAPER PAIL.

(Application filed July 9, 1902.)

Inventor

Witnesses

Oliver B. Kaiser

Edw. J. Lucas

Walter G. Haas

By Wood & Foot Attorneys

UNITED STATES PATENT OFFICE.

WALTER G. HAAS, OF DAYTON, OHIO, ASSIGNOR OF ONE-HALF TO THE DAYTON PAPER NOVELTY COMPANY, OF DAYTON, OHIO, A CORPORATION.

PAPER PAIL.

SPECIFICATION forming part of Reissued Letters Patent No. 12,060, dated November 25, 1902.

Original No. 697,405, dated April 8, 1902. Application for reissue filed July 9, 1902. Serial No. 114,924.

*To all whom it may concern:*

Be it known that I, WALTER G. HAAS, a citizen of the United States, residing at Dayton, in the county of Montgomery and State of Ohio, have invented certain new and useful Improvements in Paper Pails, of which the following is a specification.

The object of my invention is, first, to make a paper pail or bucket for holding liquid in such a manner that it will be more durable and stronger than articles of this kind heretofore produced.

Another object of my invention is to avoid piercing the inner walls of the pail, at the same time strengthening the outer loose walls of the pail, so that they will form a firm support for the bail.

Another object of my invention is to provide a tight-fitting cover for the pail, which is held in position by the bail.

The features of my invention are more fully set forth in the description of the accompanying drawings, forming a part of this specification, in which—

Figure 1:
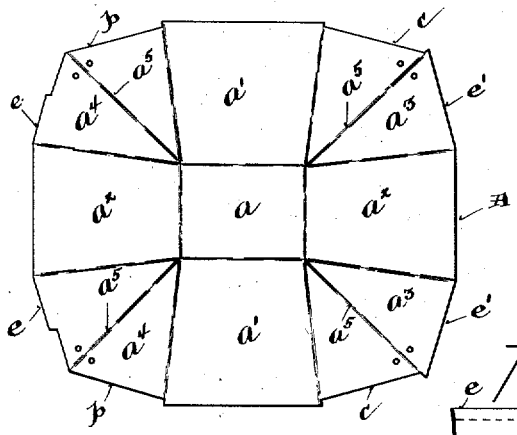
Figure 6:
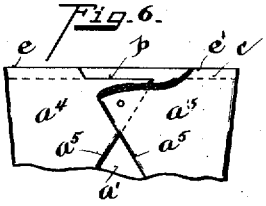
Figure 2:
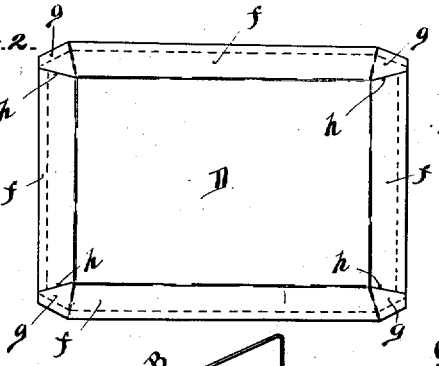
Figure 4:
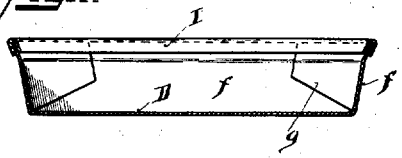
Figure 3:
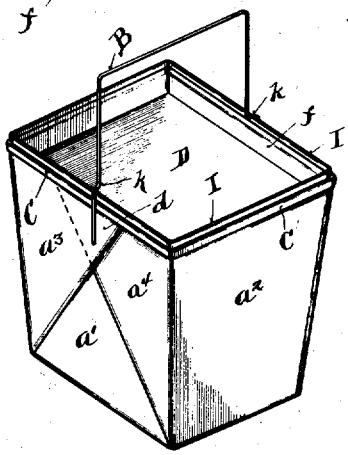
Figure 5:
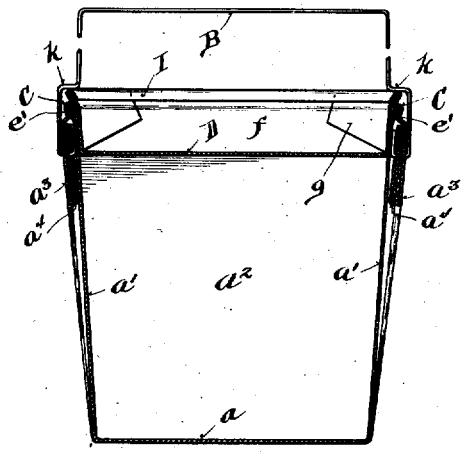

Figure 1 is a plan view of the blank from which the body of the pail is made. Fig. 2 is a blank of the cover portion. Fig. 3 is a perspective view of the completed pail. Fig. 4 is a sectional elevation of the bucket-cover. Fig. 5 is a central vertical section of the pail, showing the bail in elevation. Fig. 6 is a detail view of the top portion of the pail-body with the binding-strip removed.

In the preferred form of construction shown in the drawings a rectangular taper pail is shown, as that is the form most general in commercial use, as it allows the same to be nested for shipping.

A represents the blank from which the body of the pail is made.

$a$ represents the bottom; $a'$, two of the sides; $a^2$, the opposite sides; $a^3$, two of the corner-folds, having a scored line; $a^4$ and $a^4$, the opposite corner-folds, having a scored line $a^5$. Scored lines are likewise formed to give the side dimensions. The blank is bent up into the form shown in perspective, Fig. 3, the corner-folds overlapping each other externally on the sides $a'$.

B represents a bail which is pierced and entered through the overlapped folds $a^3$ $a^4$ and resting between said folds and the wall of the pail, which is unpunctured and liquid-tight. As these folded walls are loose and as the weight imposed upon them by the bail connection would, if unprotected, cause them to pull out and flex the body of the pail, I have provided effective means for preventing such tendency, which would destroy the usefulness of the pail.

C represents a U-shaped metallic binding, the wings of which are passed down over the inner and outer top edges of the body and firmly clamped thereto, thus securely binding the body together and preventing all danger of flexation. As the folds $a^3$ $a^4$ lie in external position against the body of the pail they overlap each other at the corners, as at $d$, presenting four thicknesses of material, which is necessary in order to form the proper bail-support and also to make the pail of one piece of material without cutting and pasting. These four thicknesses, together with the body of the pail, make five thicknesses of material, which is cumbersome for clamping with the U-shaped binding-piece. In order to avoid this undue thickness and yet to securely bind the top of the outside thickness of each fold $a^3$ and $a^4$ by means of the U-shaped binding-strip to the body, the folds $a^3$ are cut away, as at $c$, and the folds $a^4$ are cut away, as at $b$, a distance corresponding to the depth of the U-shaped binding-strip or a little greater. When thus cut away, the inside top edges of the folds $a^3$ $a^4$, respectively, are below the line of clamping; but the outside overlapping top edges $e$ $e'$, as shown in Fig. 6, are embraced by the clamping-strip and firmly bound to the main body of the pail. Thus I am enabled to attach the bail externally by securing it to the overlapping folds, which folds are firmly bound to the outside body of the pail by the binding-strip, and a pail of great strength is obtained.

My improved method of forming and securing the pail avoids the flexing of the body, as well as the flexing of the folds themselves, which would move and work when the pail was filled with liquid and carried by the bail. The surge of the contents would constantly move the overlapping side folds and wear the bail-holes, as well as unduly flexing the parts until they become disengaged.

It is essential in pails which are to contain liquid or partially-liquid contents, such as oysters, that a tight-fitting cover be made. It is also very desirable that such cover may be easily secured in position and readily detached. To accomplish this, I provide the following devices:

D represents a cover-blank. In the preferred form shown it is constructed in the following manner:

*f* represents the rims of the cover; *g*, the corner-folds, which are slitted at *h*, and when the rims are bent up they overlap the insides of the rim of the cover, as shown in Fig. 4.

I represents a U-shaped metallic clamp or binding-strip which is inserted over the top edge of the rim and clamped firmly upon the walls, securely holding the side laps *g* in position. This binding-strip on the cover when placed in position in the mouth of the pail rests upon the binding-strip of the pail and prevents the cover from being driven in too far and from becoming bound in by reason of the wedge or taper shape of the sides of the cover and pail. This binding-strip performs another very important office, which will presently be explained. The bail B is provided with shoulders *k k*, formed by the inward bending of the upper portion of the bail-limbs, as shown in Figs. 3 and 5. These limbs being elastic allow the bail to be moved into position without engagement with the top edges of the pail and cover, and when the bail is turned up in its vertical position the limbs are sprung or flexed inward, which brings the spring-shoulders *k k* into engagement with the top edge of the cover, thus holding it firmly in position for carrying. These spring-shoulders are automatically compressed when brought into contact with the body of the pail by the pivotal movement of the bail, and when moved over the top of the pail and over the inserted cover they automatically spring back into locking relation to the said cover. This cover and bail engagement serves another office. The frictional engagement of the bail with the top of the cover holds the pail in a rigid position, avoiding the pivotal movement of the bail-hooks in the walls of the pail when the filled pail is being handled, preventing rapid wear of the bail-holes in the paper folds.

It is obvious that the shoulders *k k* are merely engaging lugs, which may be of any form of construction allowing them to be readily engaged and disengaged with the edge of the cover.

The cover is trough-shaped and tapers toward the bottom substantially as the pail does, so as to nest snugly therein, forming a wedge-like cover. Likewise the plug or wedge-shaped cover is strong and materially assists in holding and bracing the pail accurately in proper position at the top. Again, in ordinary use, being close to the top of the contents in the pail, it will resist the tendency of the same to surge in handling.

The completed pail herein shown and described, it will be readily seen, is very strong, serviceable, and convenient for the handling of liquids or similar commodities as used by the ordinary retail dealers. By the construction herein shown and described not only are the dangers of leakage greatly lessened, but the liability of spilling the contents of the pail by overturning or accidental jolting is very materially lessened.

It will be observed with my vessel-shaped cover the rule for scoring is to score each side of the polygonal-shaped cover-blank with a line parallel to its adjacent edge and far enough in from the edge to give the desired dimensions to the sides of the vessel or cover. These scored lines intersect at each corner, defining a corner-flap. One of the scored lines at each corner is severed from its point of intersection outwardly to the edge of the blank. This forms a flap at each corner adapted when the sides are folded up along the scored lines to extend around the corner from its supporting side, to which it is hinged, and lie snugly against the face of the next adjacent side. The binding-strip extends around the top and holds these parts together as a unit. I preferably fold this corner-flap on the inside, bringing the edge of the adjacent side to the corner, thus presenting absolutely flush surfaces on the outside of the cover, which not only makes a neat fit into the mouth of the pail, but makes an efficient seal, preventing the leakage of liquid contents.

Having described my invention, I claim—

1. A blank for a paper pail having two correspondingly-scored lines intersecting two correspondingly-scored lines extending transversely thereto forming four sides and one bottom-section and four triangular corner-sections, a scored line bisecting each of said triangular-shaped corner-sections and a portion of the outer edges of said corner-sections being cut away whereby in folding the outer and inner layers of material upon opposite sides of the pail are flush with the top of the pail, intermediate layers of material terminating at a point below the top, substantially as specified.

2. A pail formed of a blank bent into shape, having corner-flaps formed in folding overlapping upon the opposite exterior sides of the pail, a bail hooked through said overlapping flaps upon each side, leaving the adjacent inside walls unpierced, and a reinforcing binding-strip embracing the top edges of the pail, a portion of the top edges of the said overlapping flaps which occupies an intermediate position when the pail is formed, being cut away slightly, substantially as specified.

3. A pail formed of a blank bent into shape, having corner-flaps overlapping upon the opposite exterior sides of the pail, a bail having inwardly-bent spring-shoulders, adapted to hold the cover on the pail, said bail being pivoted to said overlapping flaps upon each side, leaving the adjacent inside walls unpierced, and a reinforcing binding-strip embracing the top edge of the pail and binding the inner walls to the outer layers of the said overlapping corner-flaps, substantially as specified.

4. A paper pail or vessel formed of a single blank, and having a reinforcing binding-strip around the edge of the pail, securing the top edges of the pail and the overlapping folds together, a wedge-shaped cover of similar cross-section, adapted to be compressed into the mouth of the pail, a reinforcing binding-strip around the top edge of the cover, the lower edge of the said cover binding-strip being adapted to rest upon the top edge of the pail binding-strip when the cover is in position, a bail pivoted to the sides of the pail below its binding-strip and inwardly-bent spring-shoulders, formed on the bail, adapted to engage the top edges of the cover binding-strip, whereby the cover is held in position between the reinforcing binding elements at the top and bottom, substantially as specified.

5. In combination with a rectangular taper pail formed from a paper blank scored, folded and secured in the folded position by a U-shaped metallic clamp, a cover of similar shape formed from a blank slitted, scored and folded and held in shape by a U-shaped metallic clamp attached to the edge of the cover and adapted to seat in the mouth of the pail, substantially as specified.

6. A polygonal-sided blank for a paper vessel, having a scored line on each side, near the edge, each line being parallel with its adjacent edge, said lines intersecting at each corner, one of the scored lines at each corner being severed from its point of intersection outward to the edge of the blank, forming a series of corner-flaps, each adapted when the sides are folded up along said scored lines, to extend around the corner and overlap against the next adjacent side, and means for holding the overlapping edges together.

In testimony whereof I have hereunto set my hand.

WALTER G. HAAS.

Witnesses:
OLIVER B. KAISER,
IDA J. LUCAS.